H. M. SPRAGUE.
RAT TRAP.
APPLICATION FILED OCT. 26, 1911.
1,038,672.
Patented Sept. 17, 1912.
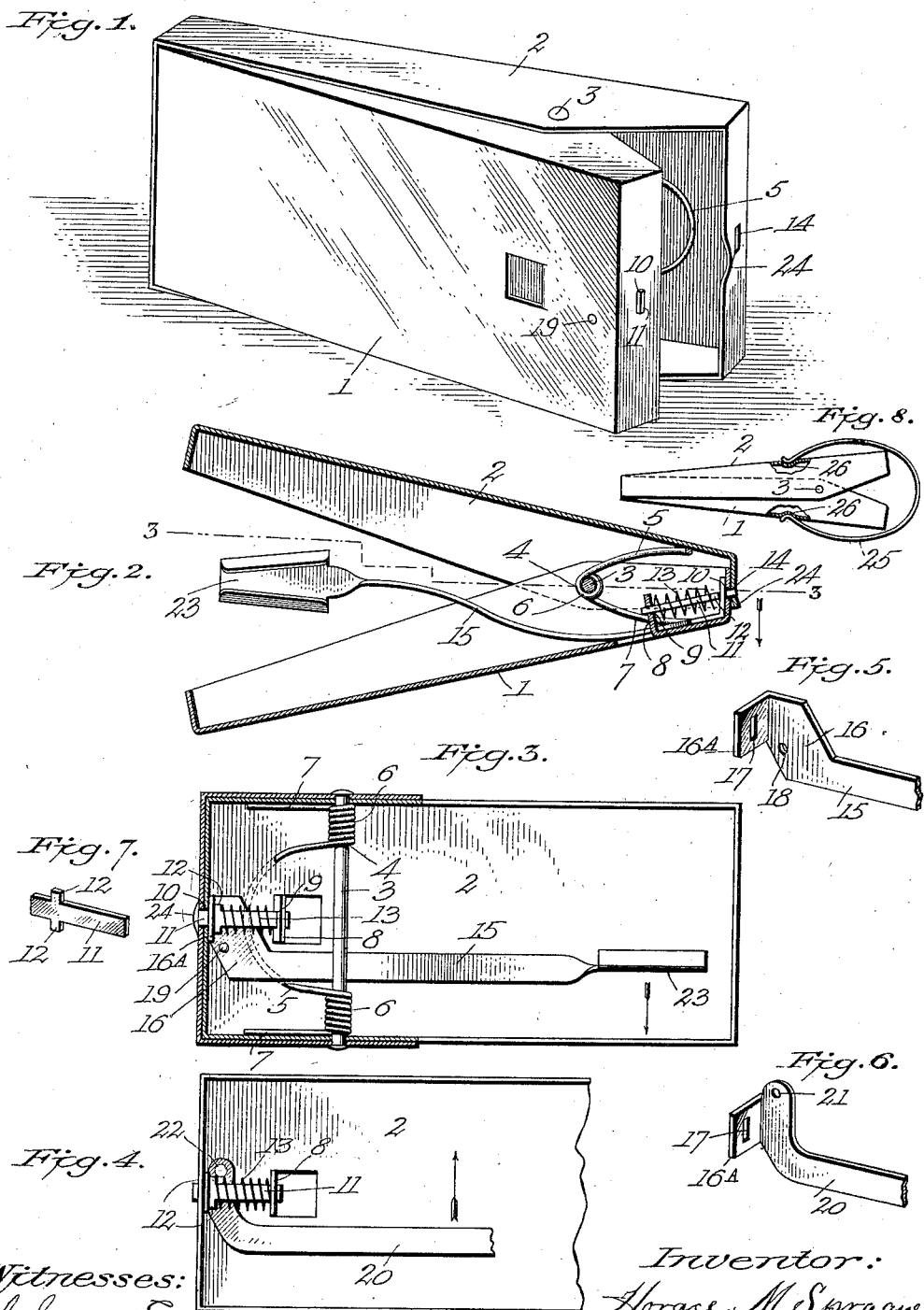
Witnesses:
G. Sargent Elliott.
Adella M. Fowle
Inventor:
Horace M. Sprague
By H. S. Bailey, Attorney.

UNITED STATES PATENT OFFICE.

HORACE M. SPRAGUE, OF DENVER, COLORADO.

RAT-TRAP.

1,038,672. Specification of Letters Patent. Patented Sept. 17, 1912.

Application filed October 26, 1911. Serial No. 656,873.

*To all whom it may concern:*

Be it known that I, HORACE M. SPRAGUE, a citizen of the United States of America, residing in the city and county of Denver and State of Colorado, have invented a new and useful Rat-Trap, of which the following is a specification.

This invention relates to improvements in traps for rats and like rodents.

The object of the invention is to provide a trap consisting of a pair of spring operated jaws which are mounted upon a common pivot which is vertically disposed, so that the jaws move on a horizontal plane, the trap being held open by a spring latch operated by a trip lever having a bait holder on its outer end. This object is accomplished by the device illustrated in the accompanying drawings, in which:

Figure 1 is a perspective view of the improved trap showing the same closed, Fig. 2 is a central, horizontal, sectional view of the trap showing the same open or set, Fig. 3 is a vertical, sectional view on the line 3—3 of Fig. 2, looking in the direction of the arrow, Fig. 4 is a side view of a portion of a jaw, showing a slight modification in the arrangement of the trip lever, Fig. 5 is a perspective view of a portion of the trip lever shown in Fig. 3, Fig. 6 is a perspective view of a portion of the trip lever shown in Fig. 4, Fig. 7 is a perspective view of the latch; and Fig. 8 is a plan view on a reduced scale, of a portion of a trap, showing a modification in the character of the spring which operates the jaws.

Referring to the accompanying drawings: Numerals 1 and 2 designate rectangular jaws, which are substantially in the form of shallow boxes or trays, the sides of which increase in width from each end and are widest at points near the rear ends of the jaws.

The jaws may be made of any suitable sheet metal, but preferably of tin, and while the metal may be slit at the corners and properly bent to form the sides and ends, it is nevertheless preferable to stamp out the jaws, and thus eliminate corner joints. One of the jaws is made slightly narrower than the other, so that it will fit within the other jaw when the jaws are closed as shown in Fig. 1.

The widest parts of the sides of the jaws are apertured near the edges thereof, and the jaws are arranged to fit one within the other, as shown by Fig. 1. The jaws are hinged together by a pin 3, which is passed through the apertures in their side members, the jaws being first placed together so that the said apertures will register. By hinging the jaws in the manner shown, their front ends fit one within the other when the jaws are closed, while their rear ends stand apart, the opposite being the case when the trap is set, as shown by Fig. 2. An actuating spring 4, is mounted on the pin 3, between the jaws, the pin 3 being passed through the said spring at the time it is passed through the sides of the jaws to hinge them together. This spring is arranged as follows: A piece of resilient wire is bent to form a semi-circular member 5, the ends of which terminate in oppositely extending coils 6, which are in axial line, and the coils terminate in straight portions 7, of suitable length. The semicircular member 5, and the straight portions 7 are brought under tension between the jaws as shown, so that the member 5 exerts an outward pressure against one jaw, while the straight portions 7 exert an outward pressure against the other jaw, and this pressure is exerted at the rear of the pivot pin 3, so that the jaws are normally held in closed relation.

The jaw 1, is slit to form a tongue 8, near its rear end, which is bent inward at right angles to the jaw and provided with a vertical slot 9. The rear end of the jaw is provided with a slot 10 in line with the slot 9, and these slots receive the opposite ends of a latch 11. This latch has oppositely extending abutment lugs 12, near its rear end, between which and the tongue 8 is interposed a coil spring 13, which surrounds the latch 11 and exerts a rearward pressure against the latch lugs 12. The rear end of the latch extends slightly beyond the end of the jaw 1, so as to enter and engage the edge of a slot 14, in the rear end of the jaw 2, when the trap is set, as shown by Fig. 2.

In order to trip the latch and allow the jaws to spring together, a trip lever 15 is employed, which, as shown in Figs. 3 and 5, comprises a horizontally disposed arm, having an upwardly extending member 16, at its rear, a portion of which is bent inwardly at right angles to form an abutment 16$^A$, having a vertical slot 17. The rear end of the lever 15 is provided with an aperture 18, and the lever is pivotally secured to the jaw 1, by a pin 19 which passes through the jaw and lever, the lever being in such position that the slot 17 in the abutment 16^A is in line with the slot 9 in the tongue 8, and the slot 10 in the end of the jaw. The rear portion of the latch 11 passes through the slot 17 of the lever, and the lugs 12 on the latch bear against the abutment 16^A, as clearly shown in Fig. 3. In this arrangement of the lever the pivot pin 19 is below the latch, hence a downward pressure on the lever is necessary to move or trip the latch. In the arrangement shown in Figs. 4 and 6, a lever 20 is employed, having an upturned rear end, which extends above the plane of the latch and is provided with an aperture 21 through which a pin 22 passes to pivot the lever to the jaw. In this instance, the pivot is above the latch, and hence the lever must be raised to move or trip the latch. The outer end of the lever may be provided with any suitable bait holder, but as shown in Figs. 2 and 3, the forward end of the lever 15 terminates in a plate 23, the sides of which are upturned and bent toward each other. These upturned sides also converge toward the front end of the plate, thus inclosing a space between them which contracts in width toward its forward end, so that bait placed in the rear end of the holder will be held by its converging sides, and any attempt on the part of a rat or other rodent either to eat or remove the bait will result in rocking the lever, thereby tripping the latch 11, which allows the jaws to spring together and entrap the rat.

In setting the trap, the rear ends of the jaws are pressed together, and as the end of the jaw 2 passes over the end of the jaw 1, the latch 11 is thereby retracted or moved forward until the slot 14 of the jaw 2 registers with the rear end of the latch, when the said latch is instantaneously thrown by its spring 13, and its rear end enters the said slot 14, and holds the trap open or set, as clearly shown by Fig. 2. The trap may be held open by the hand, or by placing any suitable object between the jaws, when the bait is being placed in the holder. The edge of the end of the jaw 2 in line with the slot 14, is outwardly bent a slight distance, as shown at 24, so that when the jaws are pressed together in setting the trap, the edge of the end of the jaw 2 will not catch upon the latch.

In Fig. 8 is illustrated a modification in the form of the jaw actuating spring. In this arrangement a substantially semicircular spring 25 is employed, which is placed over the rear ends of the jaws, with its terminal ends bearing against the said jaws, and in order to prevent slipping of the spring, the jaws are indented, as shown at 26, to receive the ends of the spring.

Having described the invention, what I claim as new and desire to secure by Letters Patent is:

1. In a trap as specified, the combination with a pair of jaws hinged together adjacent to their rear ends, and a spring for normally holding their forward ends in engagement, of a means for holding the jaws open against the tension of said spring, consisting of a spring operated latch slidably mounted upon one of said jaws and projecting through its rear end, the end of the other jaw being provided with a slot to engage the projecting end of said latch, a trip lever pivotally secured to the jaw adjacent to the latch, and having a member which engages the latch and retracts the same when the lever is rocked, and a bait holder on the forward end of the lever.

2. In a trap as specified, a rectangular box-shaped jaw having a slot through its rear end, an ear on said jaw having a slot in line with the aforesaid slot, a latch supported in said slots and extending beyond the rear end of the jaw, said latch having lateral projections near its rear end, a coil spring interposed between the lateral projections and said ear, a trip lever pivoted to the jaw, having a slotted abutment portion through which the rear end of the latch passes, and against which the lateral projections of the latch bear, and a bait holder on the forward end of the lever, a second jaw, a pin which passes through the sides of said jaws to unite them in hinged relation, and a spring on said pin which exerts an outward pressure on the jaws at the rear of the pivot pin, said second jaw having a slot in its rear end which engages the latch when the jaws are open.

In testimony whereof I affix my signature in presence of two witnesses.

HORACE M. SPRAGUE.

Witnesses:
G. SARGENT ELLIOTT,
ADELLA M. FOWLE.

---

Copies of this patent may be obtained for five cents each, by addressing the "Commissioner of Patents, Washington, D. C."